United States Patent Office 2,929,270
Patented Mar. 22, 1960

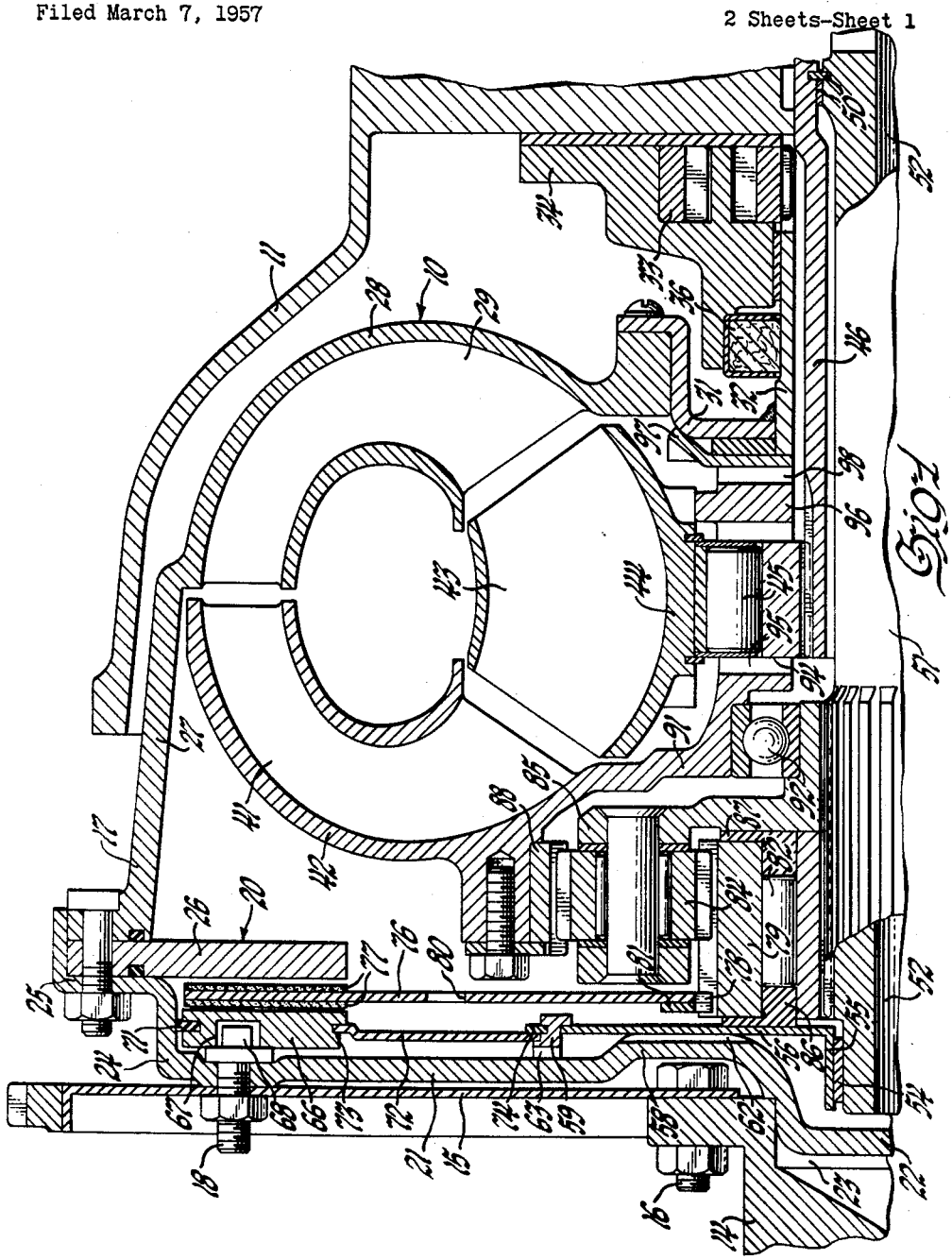

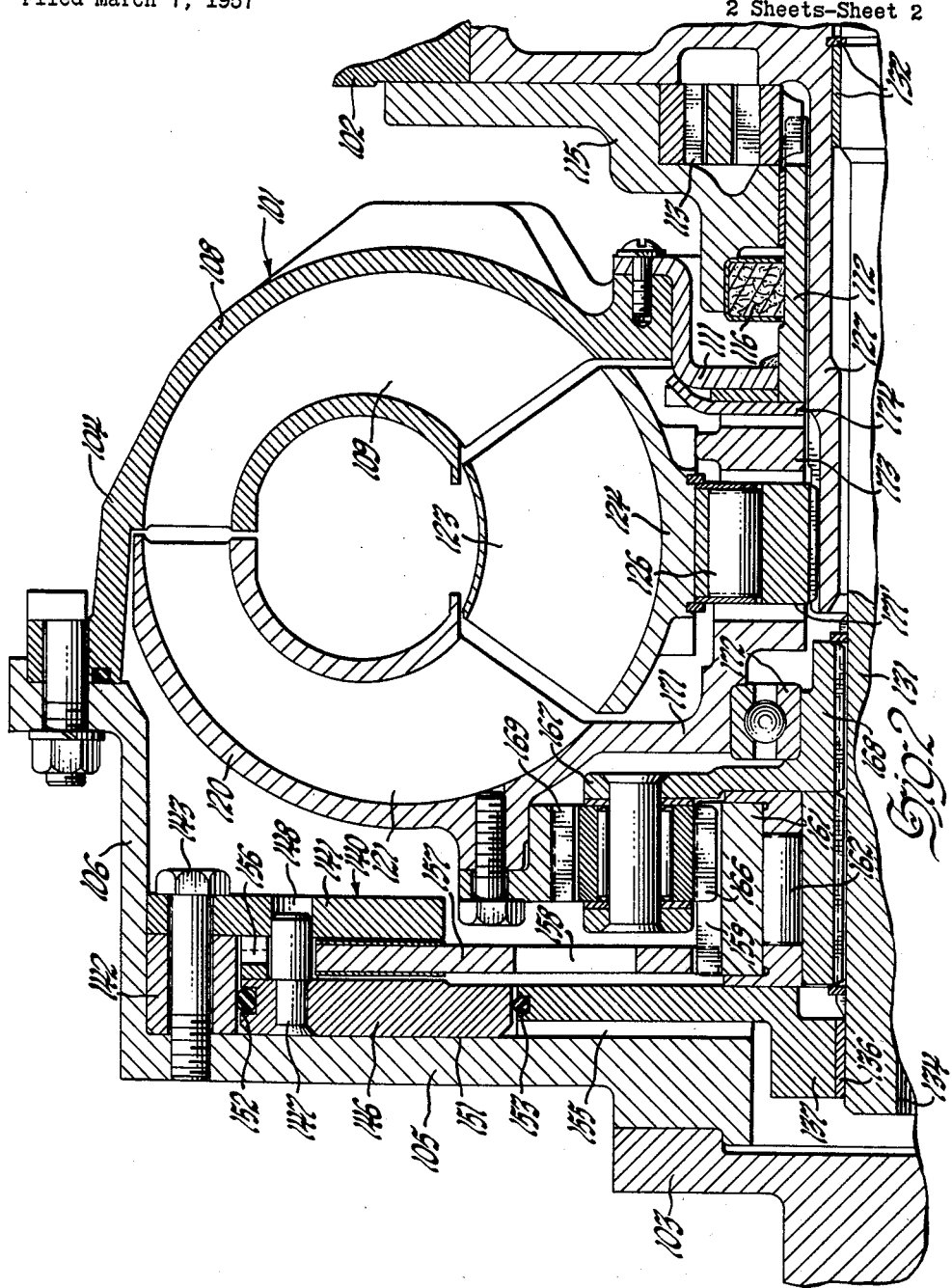

2,929,270

TRANSMISSION

Robert M. Tuck and James J. Mooney, Jr., Indianapolis, Ind., assignors to General Motors Corporation, Detroit, Mich., a corporation of Delaware Application March 7, 1957, Serial No. 644,518

16 Claims. (Cl. 74—688)

This invention relates to transmissions and more particularly to a hydraulic and gear drive.

This torque converter and gearing provide in one phase of operation a torque converter drive transmitting full torque and in another phase of operation a split torque drive transmitting part of the torque through the torque converter and part of the torque through the gear drive. The torque converter has a pump driven by an engine and a turbine connected through planetary gearing to the output and a stator. The torque converter pump circulates the fluid through the turbine blading to drive the turbine and through the stator which may be mounted for one-way rotation to redirect the fluid as it flows from the turbine to the pump. The converter turbine is connected to the ring gear of a planetary gearset which has a carrier connected to the output shaft. The sun gear of the planetary gearset is mounted on the output shaft by means of a one-way clutch which prevents backward rotation of the sun gear with respect to the output shaft. The sun gear may also be connected to the input or engine by means of the split torque clutch. When this clutch is disengaged the turbine will rotate the ring gear forwardly and tend to rotate the sun gear backwardly. Since backward rotation of the sun gear is prevented by the one-way clutch, the planetary gear unit will lock up to effect a 1:1 drive from the turbine element to the output shaft for full torque transmission through the converter. When the split torque clutch is engaged for a split torque drive, the sun gear will be driven directly by the engine and the ring gear by the turbine to provide an output speed intermediate the input or engine speed and the torque converter or turbine element output speed. In this phase of operation about one-third of the torque is transferred directly through the split torque clutch and sun gear to the output shaft and two-thirds of the torque is transferred through the fluid torque converter and ring gear to the output shaft. This construction provides during the full converter drive phase higher torque multiplication and better converter cushioning required for starting and high performance drive and for gear shifting. When the split torque clutch is engaged, higher efficiency and less slip are provided for cruising.

An object of the invention is to provide in a transmission having a torque converter and gearing, controls to provide a full fluid drive through the torque converter and a split torque drive partially through the torque converter and partially a direct mechanical connection.

Another object of the invention is to provide in a transmission including a torque converter having a pump, turbine and stator, and planetary gearing having one gear element driven by the converter turbine, another gear element connected to an output shaft and a third gear element connectible to a gear element to lock up the planetary gearing for full converter drive and a clutch engageable to drive the third gear unit with the converter drive to provide a split torque drive.

Another object of the invention is to provide in a transmission having a torque converter and planetary gearing, a mechanism to lock up an element of the planetary gearing to provide a full converter drive and a mechanism engageable to connect the input shaft to the same element of the planetary gearing to provide a split torque drive.

Another object of the invention is to provide a simplified hydraulically actuated clutch located within a torque converter housing.

These and other objects of the invention will be more fully apparent from the following description and drawing of the preferred embodiment of the invention.

Figure 1 is a section of the transmission showing the transmission;

Figure 2 is a section of a view of a modification of the transmission.

A torque converter and gearing unit 10 made in accordance with the invention is illustrated in Figure 1 in the usual location at the large forward portion of the transmission housing 11. The engine shaft 14 is secured to a flexible annular plate 15 by bolts 16 and to the rotary converter housing 17 by bolts 18 to drive the converter housing. The converter housing 17 has a forward wall 21 having a central pilot bearing extension 22 fitting into the pilot bore 23 to rotatably support the forward portion of the converter housing 17 on the engine shaft 14. The outer edge of the wall 21 has rearwardly extending flange 24 and a radial flange 25 which abuts the fixed clutch plate 26 of the split torque clutch 20, and spaces it from the forward wall 21. The rear portion 27 of the converter housing extends from the clutch plate 26 backwardly and inwardly and has a portion 28 forming a part of the torque converter torus chamber and supporting the pump blades 29. The inner portion of the housing 27 has a hub 31 attached thereto which is fixed or welded to the pump shaft 32 to drive the pump shaft and the pump 33. The pump 33 is located in a pump housing 34 secured to the transmission housing 11. A seal 36 between the pump housing 34 and the pump shaft 32 retains oil in the pump chamber.

The torque converter has in addition to the pump blades 29 turbine blades 41 mounted on the turbine element 42, and stator blades 43 on the stator element 44 which is connected through the one-way device 45 to prevent backward rotation of the stator to the ground sleeve 46 which is secured to the transmission housing 11. The output shaft 51 is located within the ground sleeve 46 and suitably supported for rotary movement and axially located by a bearing and a snap ring 50 or by bearings not shown in the transmission. The fluid supply passage 52 located in the shaft 51 supplies fluid for actuating the split torque clutch.

The forward end of the shaft 51 is rotatably supported in the bearing 54 mounted on a cylindrical flange 55 of the annular support plate 56. The plate 56 is located against the annular rib 58 on the wall 21 and held by a lip on the annular ring 59 which is suitably welded to the wall 21. Passages 62 and 63 in the rib 58 and the ring 59 respectively provide a continuation of the fluid passage 52 between the wall 21 and support 56 to supply fluid to actuate split torque clutch 20. This clutch 20 includes a piston 66 acting as a movable clutch plate located adjacent the outer portion of the wall 21 and having apertures 67 fitting extensions 68 on the bolts 18 to prevent rotary movement of the piston 66 while permitting axial movement. The outer edge of piston 66 has a fluid seal 71 engaging flange portion 24 of wall 21. The Belleville type or annular plate spring 72 provides a retraction spring for the piston 66 and forms a portion of a movable wall of the actuating chamber for the piston 66. The outer edge of the spring 72 fits in groove 73 in the inner edge of the piston 66 and is retained at its inner edge to ring 59 by a snap ring 74 to secure and seal both edges of spring 72. The driven disk 76 of the clutch has suitable facings 77 located between the piston 66 and fixed plate 26 and has at its inner diameter a splined connection 78 reinforced by element 81 with a sun gear 79. Holes 80 in the driven disk 76 permit equalization of pressure in the torque converter housing 17 on both sides of the disk.

The sun gear 79 is mounted on the output shaft 51 by means of the one-way clutch 82 which prevents backward rotation of the sun gear with respect to the shaft 51. The sun gear 79 meshes with the planet gears 84 which are mounted on a carrier element 85 suitably splined to the output shaft 51 to rotate therewith. The sun gear and the rollers of the one-way clutch 82 are axially located by thrust members 86 and 87 between plate 56 and carrier 85. The planet gear 84 also meshes with the ring gear 88 mounted on the turbine element 42. The turbine element 42 has an inwardly extending hub 91 rotatably mounted on a bearing 92 mounted on the carrier to axially locate the hub 91 with respect to the shaft 51. The hub 91 also has a thrust bearing portion 94 engaging the one-way clutch 45. A thrust bearing 96 and washer 97 are also located between the other side of the freewheeler 45 and the pump hub 31. The converter outlet passage 95 extends through thrust hub 91 and the converter inlet passage 98 extends through thrust member 96.

These thrust members and washers locate the torque converter elements and the planetary gear elements between the front wall 21 and the rear hub 31 of the converter housing 17. The hub 31 may move rearwardly due to the ballooning effect caused by the high pressure in the housing 17 since pump shaft 32 is splined to pump 33 to permit axial movement. This will merely increase the clearances between the converter and gear unit parts. The stator 44 and one-way device 45 may move to equalize these clearances. Forward movement of the turbine element 42 is prevented by thrust bearing 92 which transmits this thrust to the carrier 85 which is generally located by the thrust members 86 and 87, sun gear 79 and plate 56 transferring the thrust to the front wall 21 of the converter housing 17. However, when power is transmitted from the turbine to the output shaft 51 part of the thrust is transmitted by the splines to the output shaft. Thus the turbine thrust insures proper location of the gears of the planetary gear unit.

In the modified form of the invention shown in Figure 2, the torque converter 101 is located in the forward end of the transmission housing 102. The engine shaft 103 drives the torque converter housing 104 which has a forward wall portion 105 secured at its inner diameter to the engine shaft 103 and having in its outer diameter a rearwardly extending flange 106. The flange 106 is suitably secured to the rear portion 108 of the torque converter housing 104 which carries the pump blades 109 and the hub portion 111 connected through the pump sleeve 112 to drive the pump 113 located in a pump housing 115 secured to the transmission housing 102. A seal 116 between the housing 115 and the pump sleeve shaft 112 seals the fluid in the chamber of the pump 113.

In addition to the pump blades 109, the torque converter has turbine blades 121 on the turbine element 120 and stator blades 123 on the stator element 124. The stator is suitably connected by a one-way clutch 126 to the ground sleeve 127 which is secured to the transmission housing 102 to prevent backward rotation of the stator. The output shaft 131 is mounted in a suitable bearing and snap ring 132 in the transmission housing 102 to axially locate and rotatably support the shaft 131. Passage 134 extending through the shaft 131 is provided to conduct fluid to actuate the split torque clutch 140. The forward end of the shaft 131 is supported in a bearing 136 mounted on an inwardly extending hub portion 137 of the wall 105.

The split torque clutch 140 has a fixed plate 141 abutting a spacing ring 142 which is secured to the front wall 105 of the torque converter housing by a suitable bolt 143. The movable clutch plate 146 has a plurality of pins 147 fixed thereto and extending in apertures 148 in fixed clutch plate 141 to prevent rotation of the plates relative to each other and is located in an annular cylinder or chamber portion 151 formed in the wall 105. The movable clutch plate 146 acts as a piston located in the chamber 151 and has an outer seal 152 engaging the ring 142 which forms a portion of the chamber and an inner seal 153 located in the wall 105 engaging the inner edge of the plate 146. The passages 134 in shaft 131 and 155 in wall 105 supply fluid to the chamber 151. Retraction springs 156 of the wave type are located externally of pins 147 between the fixed plate 141 and movable plate 146 while the driven disk 157 is located internally of the pins 147, and is suitably apertured at 158 to equalize the pressure on both sides thereof. The driven disk is connected by a spline 159 to the sun gear 161 which is connected by one-way clutch 162 to prevent backward rotation of the sun gear with respect to the shaft 131. The sun gear 161 meshes with planet gears 166 mounted on the carrier 167 having a hub 168 secured by splines to the shaft 131. The turbine element 120 carries a ring gear 169 meshing with the planetary pinions 166 and has a hub 171 mounted by means of a radial and axial thrust bearing 172 on the carrier hub 168 and a thrust bearing portion 171' engaging a side face of the one-way clutch 126. Thrust bearing members 173 and 174 are located between the other side of the one-way clutch 126 and the hub 111.

The torque converter 10 illustrated in Figure 1 may operate in a first phase transmitting full torque through the fluid torque converter and in a second phase transmitting a portion of the torque through the torque converter and a portion through a direct mechanical connection. In the second phase of operation these portions of torque transmitted through the converter and the mechanical connection are combined in the planetary gear unit and transmitted through the carrier 85 to the output shaft 51. The first phase of operation is obtained when the split torque clutch 20 is disengaged. Then input shaft 14 drives the converter pump blades 29 which through the action of the fluid in the converter drive the turbine 42. The turbine drives the ring gear 88 which through the pinions 84 would tend to rotate the sun gear 79 backward. Since the one-way clutch 82 prevents backward rotation of the sun gear with respect to the output shaft 51 the sun gear is locked and the planetary gear unit is locked up for rotation at a 1:1 ratio. Thus the turbine is directly connected to the output shaft 51.

In the second phase of operation the split torque clutch 20 is engaged by the hydraulic fluid supplied by the passage 52, 62, 63 to provide a split torque drive. One of the torque paths from the engine shaft 14 through the fluid torque converter to the ring gear, is the same as in the first phase of operation. When the clutch 20 is engaged, the engine shaft 14 is connected through the housing 17 and clutch 20 to drive the sun gear 79 at engine speed. Since there is always some slippage in a fluid torque converter drive, the clutch 20 will drive the sun gear 79 faster than the turbine 42 can drive the sun gear 79 and output shaft 51 in the locked up condition occurring during the first phase of operation. Thus clutch 20 and sun gear 79 transmit engine torque to the planetary pinions 84 and at the same time the ring gear 88 transmits torque from the turbine to the other side of the planetary pinions. This torque is combined in the proportion of the radii of the sun gear and ring gear. In the transmission illustrated, about one-third of the torque is transmitted mechanically through the clutch and sun gear and about two-thirds of the torque is transmitted through the hydraulic torque converter and the ring gear.

This arrangement for providing a split torque drive and a full converter drive makes it possible to provide a torque converter for any particular engine having a higher efficiency. Normally in selecting a torque converter having a fixed capacity for an engine having a certain H.P. rating it is necessary to compromise between a small capacity torque converter which would have better performance at low output speeds and a high capacity torque converter which would have better performance at high output speeds. Thus in order to obtain the best overall performance a compromise must be made. This converter providing full converter drive and split torque permits the selection of a smaller capacity torque converter which will provide better performance and higher efficiency at low output speeds. At higher output speed where the performance of the small torque converter would be unsatisfactory the split torque clutch 20 is engaged to reduce the amount of power being transmitted through the torque converter and thus to effect an increase in the size of the converter in relation to the amount of power being transmitted. This provides improved performance and efficiency at high output speeds.

The torque converter 101 illustrated in Figure 2 has a modified structural arrangement of the split torque clutch 140 but operates in the same manner as the above described torque converter 10 to provide full converter drive when the clutch 140 is disengaged and split torque drive when the clutch 140 is engaged.

These modifications are illustrative of the invention and it will be apparent to those skilled in the art, that other modifications may be made within the scope of the appended claims.

I claim:

1. In a transmission, a housing, an input element, an output element, a fluid torque converter having a pump element connected to said input element, a turbine element, and a stator element connected to said housing, a planetary gear set having a ring gear connected to said turbine element, a sun gear member and planetary gears meshing with said sun gear member and ring gear mounted on a carrier member, one of said members being connected to said output element, a one-way clutch connected between another of said members and said output element to prevent backward rotation of said another of said members with respect to said output element, and a clutch engageable to connect said input element to said another of said members.

2. In a transmission, a housing, an input element, an output element, a fluid torque converter having a pump element connected to said input element, a turbine element, and a stator element connected to said housing, a planetary gear set having a ring gear member, a sun gear member and planetary gears meshing with said sun and ring gear members mounted on a carrier member, one of said members being connected to said turbine element, another of said members being connected to said output element, a one-way clutch connected between the third member and said output element to prevent backward rotation of said third member with respect to said output element, and a clutch engageable to connect said input element to said third member.

3. In a transmission, a housing, an input element, an output element, a fluid torque converter having a pump element connected to said input element, a turbine element, and a stator element connected to said housing, a planetary gear set having a ring gear member, a sun gear member, and planetary gears meshing with said sun and ring gear members mounted on a carrier connected to said output element, one of said gear members being connected to said turbine element, a one-way clutch connected between another of said members and said output element to prevent backward rotation of said another of said members with respect to said output element, and a clutch engageable to connect said input member to said another of said members.

4. In a transmission, a housing, an input element, an output element, a fluid torque converter having a pump element connected to said input element, a turbine element, and a stator element connected to said housing, a planetary gear set having a ring gear member connected to said turbine element, a sun gear member, and planetary gears meshing with said sun and ring gears mounted on a carrier member connected to said output element, a one-way clutch connected between said sun gear and said output element to prevent backward rotation of said sun gear with respect to said output element, and a clutch engageable to connect said input element to said sun gear.

5. In a transmission, a housing, an input element, an output element, a fluid torque converter having a housing connected to said input element, said housing having a front and a rear wall, a pump element mounted on said rear wall, bearing means secured to said front wall supporting said output element, a turbine element located in said housing spaced from said front wall and adjacent said pump element, and a stator element connected to said housing, a planetary gear set having a ring gear connected to said turbine element and located between said turbine element and said front wall, a sun gear and planetary gears meshing with said sun and ring gears mounted on a carrier connected to said output element, a one-way clutch connected between said sun gear and said output element adjacent said bearing means to prevent backward rotation of said sun gear with respect to said output element, and a clutch located within said housing engageable to connect said housing to drive said sun gear.

6. In a transmission, a housing having a front wall and a rear wall, an input element connected to drive said housing, a torque converter having a pump element mounted on the rear wall of said housing, a turbine element and a stator, a planetary gear unit having a ring gear member, a sun gear member and planetary gears meshing with said sun and ring gear members mounted on a carrier member, a first of said members being connected to said turbine element, an output element, a second of said members being connected to said output element, clutch means between a third member and said output element, first thrust bearing means between said front wall and one of said members, second thrust bearing means between said one of said members and another of said members, and third thrust bearing means between said turbine element and said another of said members.

7. In a transmission, a housing having a front wall and a rear wall, an input element connected to drive said housing, a torque converter having a pump element mounted on the rear wall of said housing, a turbine element and a stator, a planetary gear unit having a ring gear member, a sun gear member and planetary gears meshing with said sun and ring gear members mounted on a carrier member, a first of said members being connected to said turbine element, a second of said members being connected to said output element, clutch means between a third member and said output element, first thrust bearing means between said front wall and said third member, second thrust bearing means between said third member and said second member and third thrust bearing means between said turbine element and said second member.

8. In a transmission, a housing having a front wall and a rear wall, an input element connected to drive said housing, a torque converter having a pump element mounted on the rear wall of said housing, a turbine element and a stator, a planetary gear unit having a ring gear connected to said turbine element, a sun gear and planetary gears meshing with said sun and ring gears mounted on a carrier connected to said output element, clutch means between said sun gear and said output element, first thrust bearing means between said front wall and said sun gear, second thrust bearing means between said sun gear and said carrier and third thrust bearing means between said turbine element and said carrier.

9. In a transmission, a housing having a front wall and a rear portion, an input element connected to drive said housing, a torque converter having a pump element mounted on the rear wall of said housing, a turbine element and a stator, a planetary gear unit having a ring gear connected to said turbine element, a sun gear and planetary gears meshing with said sun and ring gears mounted on a carrier connected to said output element, clutch means between said sun gear and said output element, first thrust bearing means between said front wall and said sun gear, second thrust bearing means between said sun gear and said carrier, third thrust bearing means between said turbine element and said carrier, fourth thrust bearing means between said carrier and said stator and fifth thrust bearing means between said stator and said rear portion of said housing.

10. In a fluid device, a housing having a wall, a cylindrical flange extending from one side of said wall, an annular piston located adjacent said one side of said wall and mounted for axial movement toward and away from said wall and having sealing means on the outer edge in axial sliding sealing engagement with the internal surface of said flange and an inner edge, an annular resilient spring located within said annular piston and having an outer edge and an inner edge, means to secure and seal said outer edge of said spring to said inner edge of said annular piston, means to secure and seal said inner edge of said annular spring to said wall to provide an annular chamber between said wall and said piston and spring, said spring being stressed during movement of said annular piston in one direction to provide a retraction force to return said annular piston, and means to supply fluid to said chamber to actuate said piston.

11. In a fluid device, a housing having a wall, a cylindrical flange extending from one side of said wall, an annular piston located adjacent said one side of said wall and mounted for axial movement and having an outer edge engaging said flange and an inner edge, an annular spring having an outer edge and an inner edge, means to secure and seal said outer edge of said spring to said inner edge of said piston and a ring attached to said wall and securing and sealing said inner edge of said spring to said wall to provide a chamber between said wall and said piston and spring, said spring being stressed during movement of said annular piston in one direction to provide a retraction force to return said annular piston, and means including a passage transversely through said ring to supply fluid to said chamber to actuate said piston.

12. In a transmission, a shaft, a housing having a forward wall located transversely to and adjacent one end of said shaft, a bearing rotatably supporting said one end of said shaft, an annular plate fixed to said bearing, a ring having a lip engaging the outer edge of said plate secured to said wall to radially locate said plate and to hold said plate against said forward wall, a cylindrical flange extending from said one side of said wall externally of said ring, an annular piston having an outer edge engaging said flange, and an annular spring having an outer edge secured and sealed to the inner edge of said piston and an inner edge secured and sealed to said ring.

13. In a transmission, a shaft, a housing having a forward wall located transversely to and adjacent one end of said shaft, a bearing rotatably supporting said one end of said shaft, an annular plate fixed to said bearing, an annular rib on said wall engaging said plate, a ring secured to said wall having a lip engaging the outer edge of said plate to radially locate said plate and to hold said plate against said rib, a cylindrical flange extending from said one side of said wall externally of said ring, an annular piston having an outer edge engaging said flange, and an annular spring having an outer edge secured and sealed to the inner edge of said piston and an inner edge secured and sealed to said ring.

14. In a transmission, a shaft, a housing having a forward wall located transversely to and adjacent one end of said shaft, a bearing rotatably supporting said one end of said shaft, an annular plate fixed to said bearing, an annular rib on said wall engaging said plate, a ring having a lip engaging the outer edge of said plate secured to said wall to radially and axially locate said plate, a cylindrical flange extending from said one side of said wall externally of said ring, an annular piston mounted for axial movement having an outer edge engaging said flange, an annular spring having an outer edge secured and sealed to the inner edge of said piston and an inner edge secured and sealed to said ring, and means to supply fluid to the variable volume chamber defined by said forward wall, said cylindrical flange, said annular piston, said annular spring and ring to move said piston.

15. In a transmission, a housing having a wall, movable sealing means located adjacent one side of said wall and mounted for axial movement toward and away from said wall, an imperforate annular resilient spring having an outer portion and an inner portion, means to secure and seal one portion of said spring to said movable sealing means, means to secure and seal the other portion of said spring to said wall, means including said movable sealing means and said spring providing a variable volume chamber between said wall and said movable sealing means and spring, said spring being stressed during movement of said annular piston in one direction to provide a retraction force to return said annular piston, and means to supply fluid to said chamber to actuate said piston.

16. In a transmission, a housing, an input element, an output element, a fluid torque converter having a pump element connected to said input element, a turbine element, and a stator element connected to said housing, a planetary gear set having a ring gear member, a sun gear member and planetary gears meshing with said sun and ring gear members mounted on a carrier member, a one way clutch connected between a first of said members and another of said members to prevent backward rotation of one with respect to the other, a second of said members being connected to said turbine, a third of said members being connected to said output element, and a clutch engageable to connect said input element to said first member.

References Cited in the file of this patent

UNITED STATES PATENTS

| | | |
|---|---|---|
| 2,301,451 | Pollard | Nov. 10, 1942 |
| 2,312,849 | Pollard | Mar. 2, 1943 |
| 2,589,291 | Sanford | Mar. 18, 1952 |
| 2,745,435 | Hobbs | May 15, 1956 |